United States Patent
Bims et al.

(10) Patent No.: US 6,965,769 B2
(45) Date of Patent: Nov. 15, 2005

(54) TESTING CENTER

(75) Inventors: Harry V. Bims, Palo Alto, CA (US); Donna Brown, Campbell, CA (US)

(73) Assignee: Glenayre Electronics, Inc., Duluth, GA (US)

( * ) Notice: Subject to any disclaimer, the term of this patent is extended or adjusted under 35 U.S.C. 154(b) by 617 days.

(21) Appl. No.: 09/865,398

(22) Filed: May 25, 2001

(65) Prior Publication Data

US 2003/0008648 A1 Jan. 9, 2003

Related U.S. Application Data

(62) Division of application No. 09/003,260, filed on Jan. 6, 1998, now Pat. No. 6,259,911.

(51) Int. Cl.[7] .................................. H04Q 7/20
(52) U.S. Cl. .................. 455/423; 455/425; 455/67.11; 455/558
(58) Field of Search ................................ 455/423, 424, 455/67.11, 67.14; 370/466, 467, 242, 252; 340/7.21, 7.1

(56) References Cited

U.S. PATENT DOCUMENTS

| | | | |
|---|---|---|---|
| 4,875,038 A | 10/1989 | Siwiak et al. | 340/825.44 |
| 4,977,399 A | 12/1990 | Price et al. | 455/424 |
| 5,170,487 A | 12/1992 | Peek | 455/45 |
| 5,451,839 A | 9/1995 | Rappaport et al. | 375/224 |
| 5,619,550 A | 4/1997 | Averbuch et al. | 379/5 |
| 5,742,590 A | 4/1998 | Lin et al. | 370/252 |
| 5,754,946 A | 5/1998 | Cameron et al. | 455/38.1 |
| 5,799,012 A | 8/1998 | Ayerst et al. | 370/336 |
| 5,892,442 A | 4/1999 | Ozery | 340/539 |
| 5,974,238 A | 10/1999 | Chase, Jr. | 709/248 |
| 6,064,409 A * | 5/2000 | Thomsen et al. | 345/700 |

* cited by examiner

*Primary Examiner*—Temica Beamer
(74) *Attorney, Agent, or Firm*—Christensen O'Connor Johnson Kindness PLLC

(57) ABSTRACT

A network operations center comprised of hardware and software that tests paging devices, such as two-way paging devices to determine that they conform to a specified protocol.

1 Claim, 15 Drawing Sheets

TESTING CENTER

This is a divisional of application Ser. No. 09/003,260, filed on Jan. 6, 1998, now U.S. Pat No. 6,259,911.

FIELD OF THE INVENTION

The present invention relates to the field of communications systems, such as paging systems; more particularly, the present invention relates to systems for testing communications devices, such as paging devices.

BACKGROUND OF THE INVENTION

Today, communications devices, such as paging devices undergo testing to determine whether they conform to the particular communication protocol. In the case of paging systems, there are three typically used protocols referred to as FLEX™, ReFLEX50™ and ReFLEX25™ protocols. In the prior art, protocol conformance testing is performed by one-way paging systems, and thus, only one-way devices (i.e., devices only capable of receiving paging messages, not transmitting paging messages) are tested. In the prior art, the testing is performed by a protocol encoder, which acts as a signal generator to simulate a one-way paging protocol by encoding a single outbound channel for the one-way paging device. The paging device is connected to the encoder to undergo testing. During testing, the one-way paging device could be tested for compliance to the protocol through a series of messaging scenarios.

However, newer protocols allow for two-way paging. In two-way paging, the paging network transmits and receives simultaneously, and the paging device must be tested for both receiving and transmitting. Therefore, the encoders used for testing one-way paging devices are not sufficient. Furthermore, the testing of two-way paging devices is more complicated because the protocols typically include acknowledgment or message receipt transmission, as well as message origination from the paging device. Also, the two-way paging protocols often support use of multiple channels. That is, the paging device can be made to switch communication frequencies. Each feature of the protocols for two-way paging is tested, and since paging devices receive on multiple frequencies, the tester must transmit on multiple frequencies. Therefore, a new testing system is needed to handle testing of two-way paging devices. The present invention provides such a testing system.

SUMMARY OF THE INVENTION

A system providing a multi-channel wireless communications testing environment is described. In one embodiment, the system includes a transmitter, a receiver and a protocol engine. The protocol engine is interfaced to the transmitter and receiver. The protocol engine sends information to and receives information from a two-way communication device, respectively, to test the two-way communication device for compliance with multiple communication protocols.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
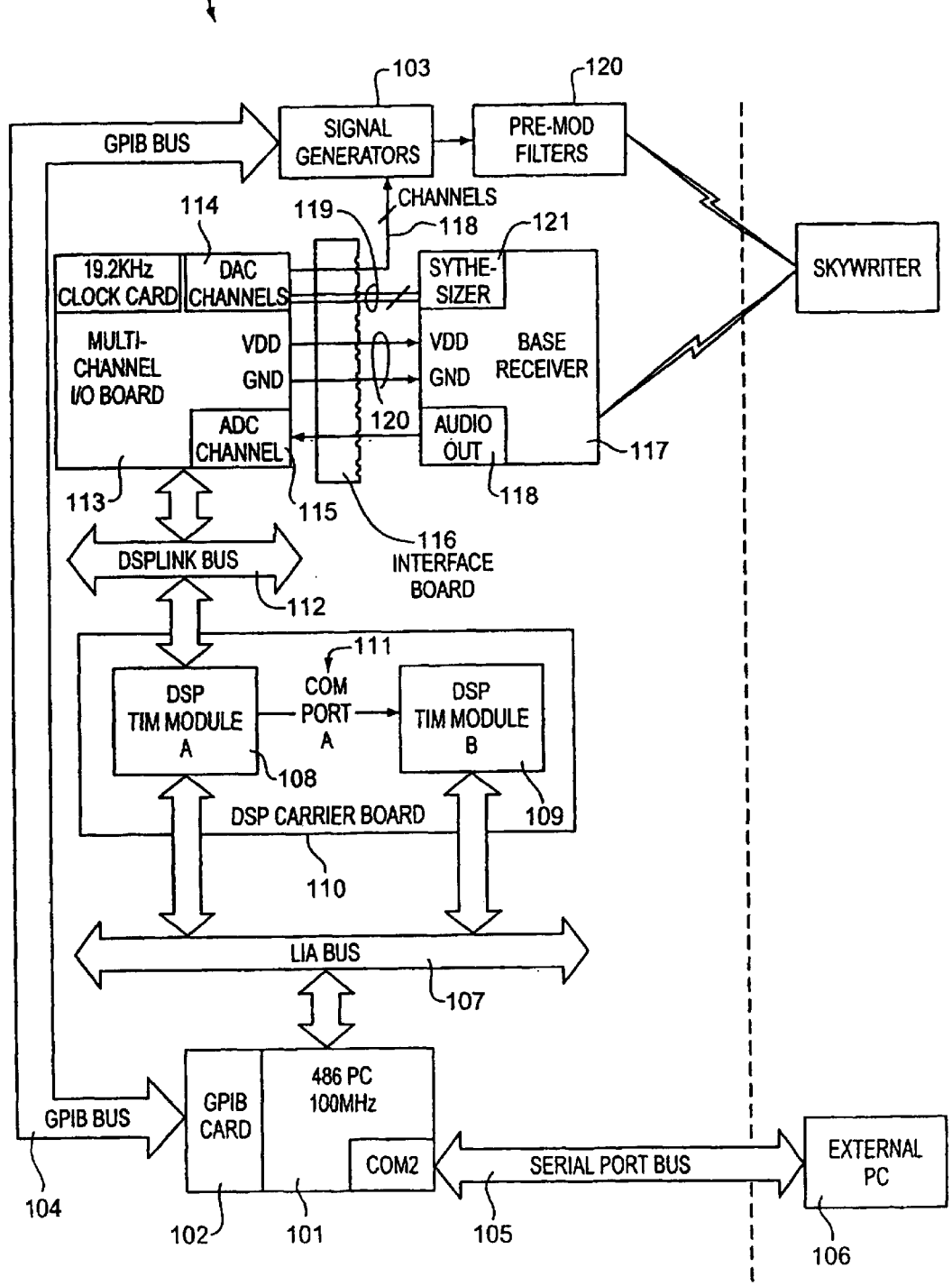
FIG. 1 is a block diagram of one embodiment of a network operations center hardware architecture.

A system for testing communication devices is described. In the following description, numerous details are set forth, such as types of protocol, numbers of channels, coding types, etc. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magneto-optical disks, read-only memories (ROMs), random access memories (RAMs), EPROMs, EEPROMs, magnetic or optical cards, or any type of media suitable for storing electronic instructions, and each coupled to a computer system bus. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Overview

The Network Operations Center (NOC) provides a mechanism for creating a multi-channel wireless communications environment to test paging devices (e.g., pagers). In one embodiment, the NOC system of the present invention provides a testing environment with a single platform to perform engineering testing, manufacturing testing, and application testing. The engineering testing that the NOC provides may be used to test pager software and/or hardware, such as testing, for example, an antennae or a radio frequency (RF) designs. Manufacturing testing provided by the NOC is used to test pager operation in sending and receiving messages or other information, such as for example, acknowledgments. The manufacturing testing also tests paging devices that have undergone rework or repair. Application testing allows the NOC to provide a test platform for testing application designs for one-way or two-way paging. Thus, the network operation system of the present invention provides a testing environment for paging that includes one platform that accommodates engineering testing, manufacturing testing and application testing.

In one embodiment, the system includes a transmitter, a receiver, and a protocol engine. The protocol engine is interfaced to the transmitter and receiver and may send information to and receive information from a two-way communication device, to test the two-way communication device for compliance with multiple communication protocols. A user interface provides access to and control of the NOC and its protocol engine to facilitate the testing in the three main areas of engineering testing, manufacturing, and application testing.

In one embodiment, the protocol engine comprises software being executed on hardware, allowing the NOC to support multiple protocols concurrently. These protocols can be used on multiple channels at the same time or can be combined on a single channel. In one embodiment, these protocols include FLEX™, REFLEX25™ and REFLEX50™. In one embodiment, the protocol engine controls multiple (e.g., 4, 6, etc.) forward channels simultaneously. In the case of REFLEX™, this allows it to transmit multiple channels of the REFLEX™ family. The ability to support multiple protocols concurrently, as well as multiple channels simultaneously allows for testing with adjacent channels that are of different protocols.

The present invention also provides an automated test suite environment that provides for two-way regression testing and allows for setting up and running of test scripts to two-way paging devices through the NOC.

Although the following description discusses applications of a network operations center for testing paging devices, features of the system may have applications beyond paging device testing and may be applicable to other communications devices and other systems such as data application testing over GSM, CDMA, or TDMA channels (PCS service testing).

I. Hardware Architecture

In one embodiment, the multi-channel wireless communications environment supports the transmission and reception of the FLEX™, ReFLEX50™, and ReFLEX™25 protocols to facilitate testing of paging devices.

A. A Network Operations Center Hardware Design

One embodiment of the NOC is shown in FIG. 1. Referring to FIG. 1, NOC 100 comprises a computer system with a processor 101 contained in a rack mount chassis. In one embodiment, processor 101 is responsible for handling coordination of all testing performed by NOC 100. This coordination includes message generation and the processing of received messages. In one embodiment, processor 101 comprises a 100 MHz Intel 486 processor.

NOC 100 also includes a General Purpose Instrument Bus (GPIB) card 102 that is coupled to processor 101 and to a bus slot in the computer system. GPIB card 102 is a standard protocol card for test instruments. In one embodiment, the bus slot is an ISA bus slot, although other buses may be used. Through GPIB card 102, NOC 100 is able to control multiple generators 103 via external GPIB bus 104, setting frequency, power level, modulation, and the like. Control of signal generation using a GPIB card is well-known in the art. In one embodiment, GPIB card 102 controls 4 signal generators. Signal generators 103 modulate a data stream over the air via pre-modulation filters 120.

In one embodiment, an optional serial port bus 105 is provided to allow another computer system 106 to communicate with and control NOC 100. Computer system 106 may be a work station, personal computer, server-based computer system, etc. In one embodiment, computer system 106 is able to send and receive messages to wireless messaging devices by communicating with NOC 100 using a messaging protocol. Note that other systems may be coupled to NOC 100 through other parallel or serial ports included in NOC 100.

A special Link Interface Adapter (LIA) bus 107 facilitates communication between processor 101 and the two DSP processors 108 of 109 of NOC 100. DSP processors 108 and 109 reside on a DSP carrier board 110 in the form of 'TIM Modules'. In one embodiment, there are two such modules on the board, TIM Module A, and TIM Module B, although other embodiments may have more or less modules. DSP processors 108 and 109 handle the low level protocol activity. For example, in one embodiment, DSP processors 108 and 109 maintain strict timing for all transmitted and received channels. DSP processors 108 and 109 may also perform error correction on received data, and perform error encoding on transmitted data. There is an on-board Communications Port (COM port) 111 for communication between the modules. A DSPLINK bus 112 provides communication access between TIM Module A and a Multi-channel I/O board 113.

I/O board 113 has capability for accommodating one or more output Digital-to-Analog Converter (DAC) channels 114, as well as one or more Analog-to-Digital Converter (A/D) channels 115. In one embodiment, these channels operate continuously in parallel. In one embodiment, DAC channels 114 comprise 7 channels; however, any number of such DAC channels may be included in the system. In one embodiment, A/D channels 115 comprises a single 14-bit channel; however, the size and number of channels is selected to provide the requisite bandwidth.

The Interface Board 116 provides a connector mapping between the connector on the rear of I/O board 113 and the connectors required to interface to signal generators 103 and base receiver 117.

DAC channels 118 are routed to signal generators 103 and control their FM Modulation deviation. In one embodiment, signal generators 103 drive the data transmission over the air in the 900 MHz band. In one embodiment, DAC channels 118 comprise four channels that are synchronously strobed from a common 19.2 KHz clock source on I/O board 113. ADC channel 115 is strobed from the same clock source on DAC channel 118. However, separate clock sources may be used. ADC channel 115 and DAC channel 115 are well-known in the art. Note that in one embodiment, the clock source also provides hardware interrupts to TIM Module A DSP processor 108. Such interrupts are used to signal TIM Module A DSP processor to read sampled data in the ADC registers.

Base receiver 117 is a radio frequency (RF) receiver that receives data over the air from the pager and converts the information to a baseband signal. Base receiver 117 is tuned to a specific frequency within its bandwidth of operation by programming its synthesizer 121 to generate the correct local oscillator (LO) frequency. In one embodiment, base receiver 117 is capable of downconverting any ReFLEX50™ inbound channel transmission in the 901–902 MHz band; however, base receiver 117 may be configured to downconvert an inbound channel transmission adhering to any protocol. The downconverted output is provided through the audio out port 118 and is routed to the input of the ADC channel 115. ADC channel 115 may comprise one or more channels that sample the downconverted data and forward the sampled data onto processor 101 for processing.

DAC channels 119 are routed from Multi-channel I/O board 113 to provide the required clock, data, and strobe lines to program synthesizer 121. DAC channels 119 may comprise any number of channels may be used, including one multiplexed channel. In one embodiment, DAC channels 119 comprises three channels.

Power (VDD) and ground (GND) lines 120 are also provided to base receiver 117 from Multi-channel I/O board 113.

Alternative Network Operations Center Design

Figure 2:
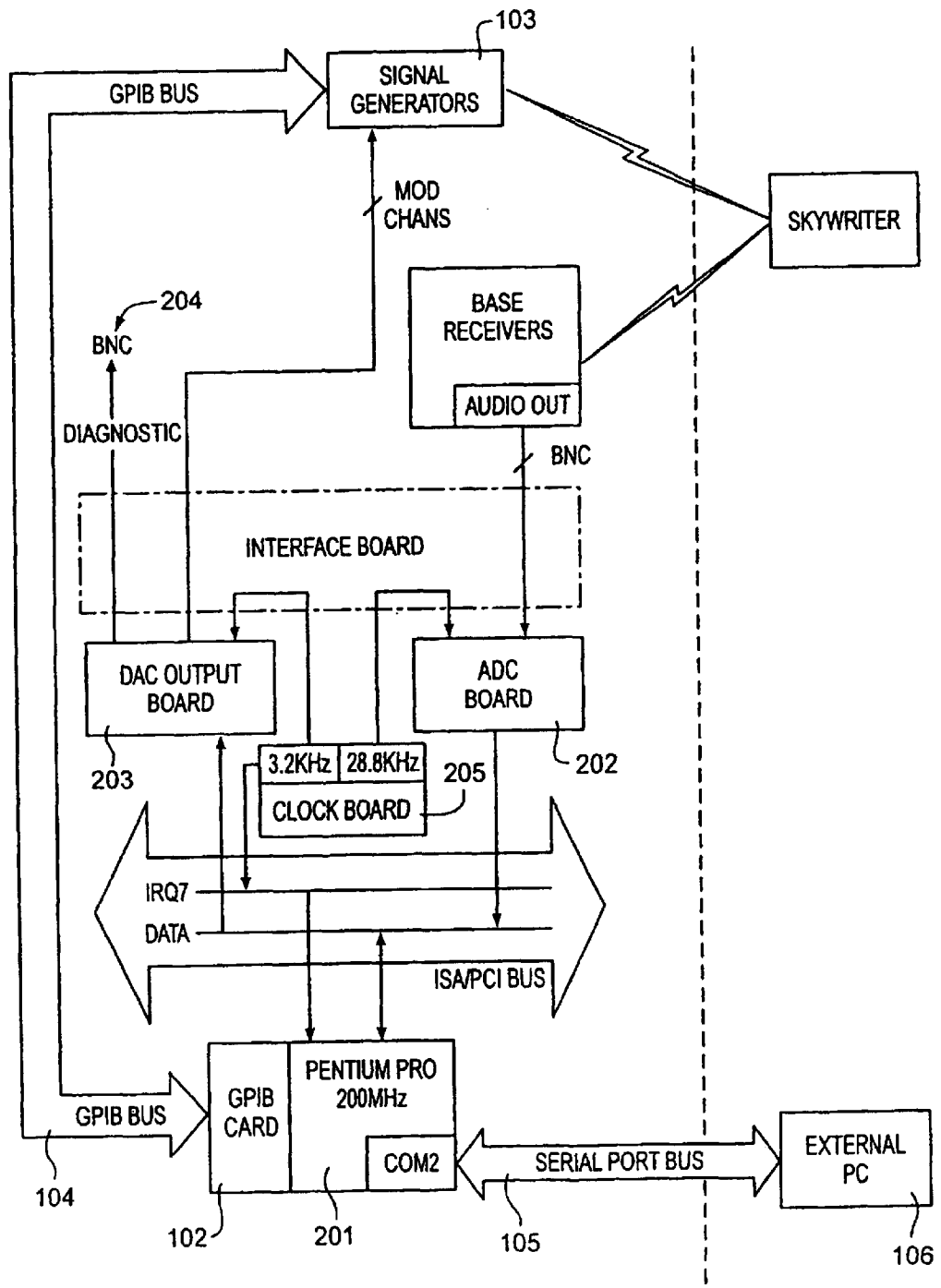
FIG. 2 is a block diagram of another embodiment of a network operations center hardware architecture.

FIG. 2 is a block diagram of an alternate embodiment of the NOC of the present invention. The main benefits of this design are lower cost, fewer processors, increased performance, and higher reliability components.

Referring to FIG. 2, NOC 201 comprises processor 201. In one embodiment, processor 201 comprises a 200 MHz Intel Pentium Pro 201. The two DSP processors 108 and 109 have been eliminated, and their functionality absorbed into processor 201. A multiple (e.g., 2) channel ADC board 202 and a multiple (e.g., 6) channel DAC output board 203 have replaced I/O board 113, saving cost while increasing performance. In one embodiment, DAC output board 203 comprises two DAC channels 204 for diagnostic purposes. Any number of channels may be included in the system.

A clock board 205 provides clock signals to components of NOC 301. In one embodiment, a first clock triggers both channels on the ADC board simultaneously. In one embodiment, the first clock comprises a 28.8 KHz clock. A second clock provides hardware interrupts to processor 201, as well as a trigger source for the DAC output channels 203. In one embodiment, the second clock comprises a 3200 HZ clock.

Base receivers 206 are RF receivers. In one embodiment, base receivers 206 does not have a synthesizer, but rather uses a fixed frequency crystal oscillator. This eliminates the control lines for synthesizer programming. It also has its own external power supply (not shown), which eliminates the need for power lines as well.

In one embodiment, the operating system of the NOC is a Windows 3.1 or NT operating system, sold by Microsoft Corporation of Redmond, Wash.

Although not shown, each system includes or has access to one or more memories. These memories may store information to run the system and may store database, such as class definition databases or automated test scripts described below. Also, although only one processor is shown, multiple processors or processing devices may be included in the NOC. Moreover, although multiple boards have been discussed above, many components may be included in a lesser number of boards or a greater number of boards.

II. Software Architecture

A. High-level Description

Figure 3:
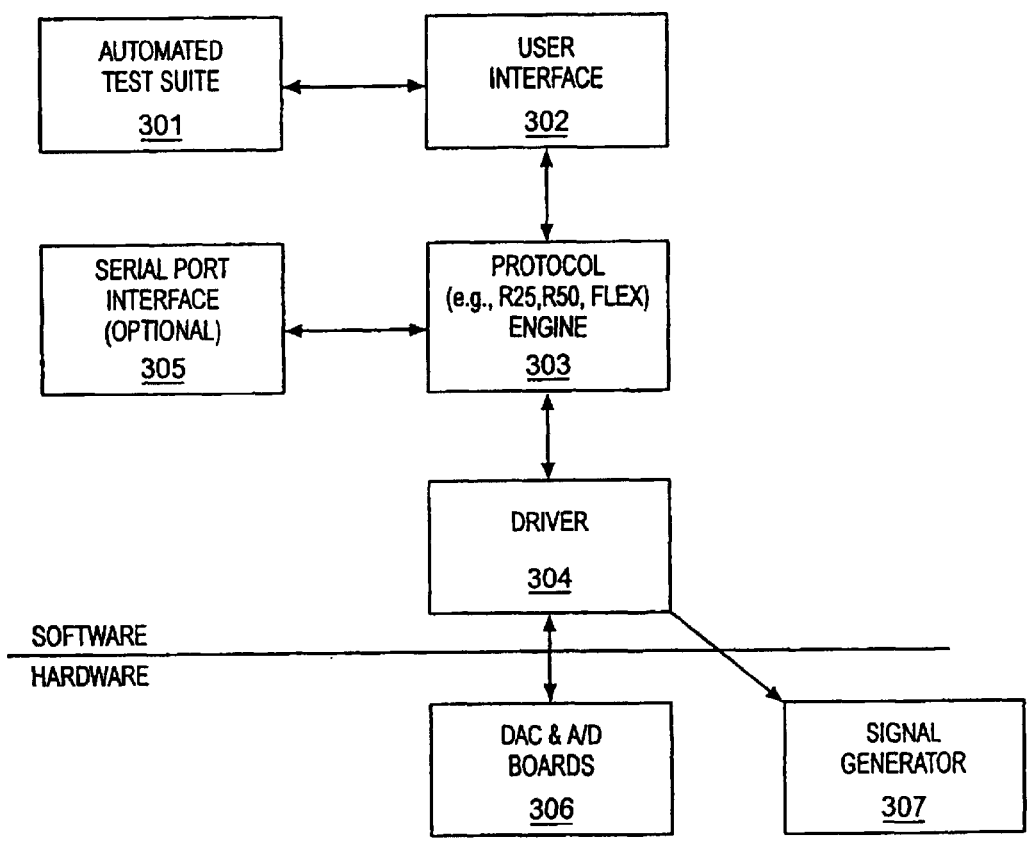
FIG. 3 is an overview of one embodiment of a software architecture of a network operations center of the present invention.

One embodiment of the software architecture of the NOC is described in FIG. 3. Although each block is described in terms of a software, one, more or all of these features and functions of these blocks may be implemented in hardware, such as, for example, hardwired logic.

Referring to FIG. 3, the software architecture comprises a set of blocks or modules, each of which may be autonomous. There is an Automated Test Suite (ATS) block 301 that creates message scenarios to be played back via the NOC hardware architecture. In one embodiment, ATS block 301 includes a file manager to coordinate accessing files, including opening, closing, saving, and deleting files which may be included in a database. ATS block 301 may provide a default scenario for testing one or more paging devices. In one embodiment, ATS block 301 allows users to create files that contain information for configuring the NOC and sending messages through the NOC. These files may be ASCII coded text files.

User interface 302 is a graphical user interface (GUI) that gives the user the capability to configure the NOC and send messages dynamically. Through user interface 302, a user may select an ATS file and have the file sent onto protocol engine 303 (described below). For instance, user interface 302 allows entry of addresses of paging devices. User interface 302 allows the user to control protocol engine 303 by selecting a protocol that is being transmitted over the air, including the protocol speed and message types (alphanumeric, numeric, etc.). User interface 302 also provides a user the opportunity to obtain information (e.g., a "snapshot") of what is happening in the NOC at any point in time. User interface 302 also allows a user to modify, change, replace and/or add data information such as, for example, parameters in an ATS file. In one embodiment, user interface 302 also allows a user to save a modified version of an ATS file. User interface 302 may be a Windows 3.1 or NT (4.0) GUI. An example of one particular interface is shown in FIGS. 8A–8G.

Protocol engine 303 accommodates multiple protocols, including the coordination of message transmission with at least one paging device for one or more of the multiple protocols being tested by the NOC. In response to an ATS file, protocol engine 303 performs scheduling and transmitting for the selected protocol, including formatting the data properly. Protocol engine 303 sends new messages out to each paging devices These messages may configure the paging device for such protocol specific features as indicating how often a message is sent, controlling the duty (collapse) cycles of a paging device, the date and time as message is sent, and which channel the paging devices is to listen to and at which time. In one embodiment, protocol engine 303 is a C++, object-oriented structure that accommodates the FLEX, ReFLEX™25, and ReFLEX™ 50 protocols. In another embodiment, an InFLEXion protocol may also be included or may replace one or more of the previously mentioned protocols, or other protocols may be included.

Device driver 304 is a block that interfaces to the NOC hardware, shown as DAC and A/D boards 306 and signal generator 307. In one embodiment, device driver 304 comprises a Windows NT monolithic driver or other driver capable of performing a software-hardware interface. Device driver 304 performs calls to and returns from hardware in the NOC, which are based on the requirements of the hardware (e.g., boards) in the system. In another embodiment, device driver 304 comprises a virtual device driver.

Serial port interface block 305 is an optional interface that allows communication between the NOC and an external computer system or network. Serial port interface block 305 communicates with the remainder of NOC to facilitate this communication. Serial port interface 305 allows a user to bypass user interface 302 and control or program the NOC to set up a specific test or test environment. In one embodiment, serial interface port 305 is used to facilitate manufacturing testing.

In one embodiment, records are sent over the serial port interface 305 and comprise three portions, or fields, that include a record type field, a length of record field, and a data field. The record type may specify that the message type is a control message. Control messages include, for example, messages to control the power level of the paging device. Other message types include, but are not limited to, a message to specify a type (e.g., alphanumeric, numeric, and binary) or to communicate the collapsed value of a paging device (e.g., sleep or duty cycles of the paging device).

B. Protocol Engine

1. OSI Model for FLEX-family Protocols

Figure 4:
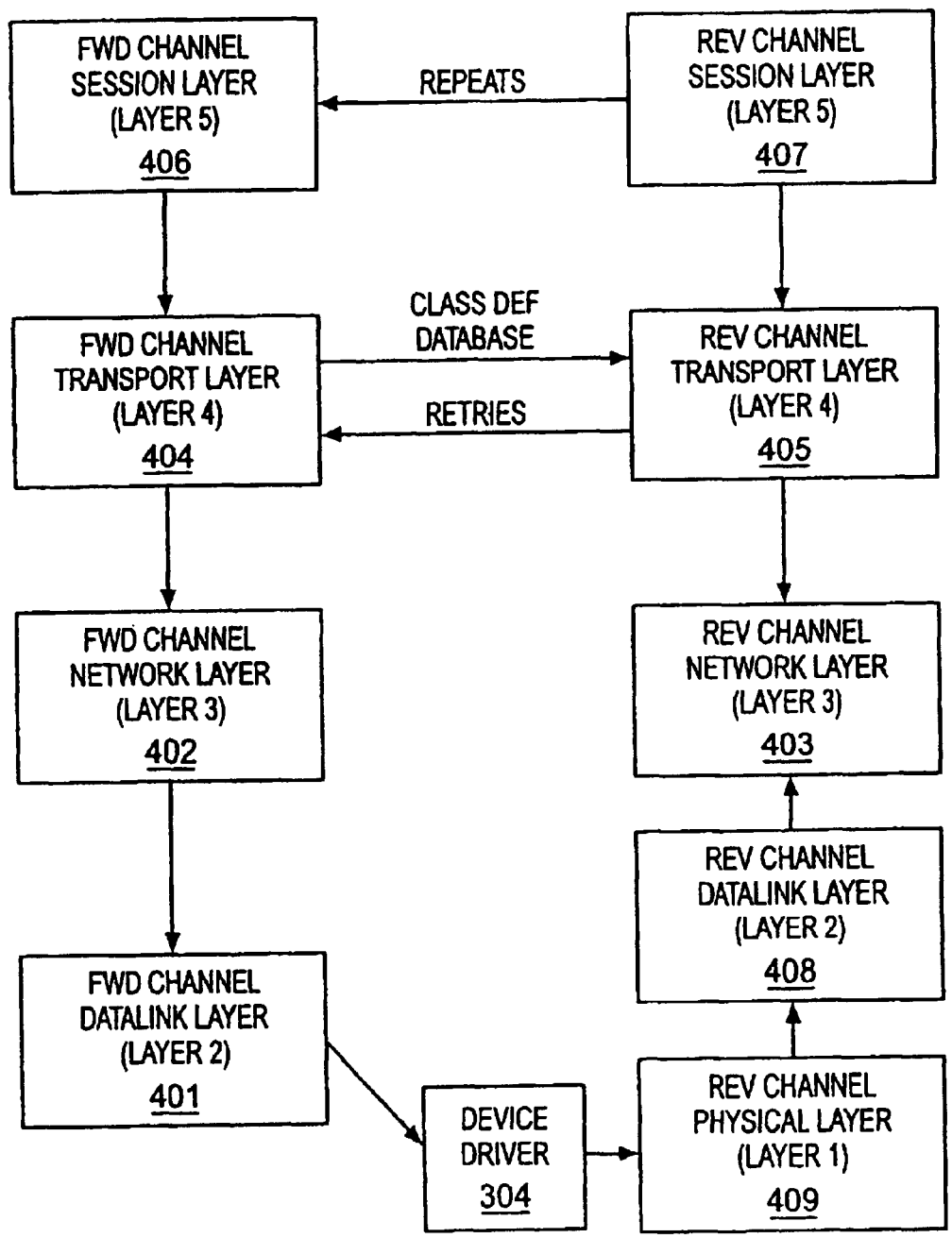
FIG. 4 illustrates an OSI decomposition of one embodiment of a protocol engine of the present invention.

The OSI protocol stack decomposition of the FLEX-family of protocols is shown in FIG. 4. This architectural model of the protocol engine takes advantage of the object-oriented programming methodology. At the most generic level, the OSI decomposition is protocol independent. In one embodiment, the protocol engine is based on an OSI decomposition, which is capable of generating and receiving any FLEX-family protocol.

Referring to FIG. 4, the OSI model includes forward channel session layer 406, forward channel transport layer 404, forward channel network layer 402, forward channel data link layer 401, device driver 304, reverse channel physical layer 409, reverse channel datalink layer 408, reverse channel network layer 403, reverse channel transport layer 405, and reverse channel session layer 407. During transmission of a message to an outbound channel of the NOC system, the message percolates from forward channel session layer 406 through to the forward channel data link layer 401 and out through device driver 304. When messages are received from paging devices, they are received by device driver 304 and percolate through reverse channel physical layer 409 through to reverse channel session layer 407.

Physical layer (Layer 1) 409 in the OSI model is implemented through a combination of NOC hardware and the NOC device driver 304. In the NOC, device driver 304 converts symbol information into the proper FM symbol deviation for each of the supported outbound channels (e.g., 6 outbound channels) simultaneously. In one embodiment, this symbol information is 4-level symbol information. Physical layer 409 is also responsible for updating new symbols on each of these channels at a predetermined rate of symbols per second. In one embodiment, this rate is 3200 symbols per second. For the inbound channels, device driver 304 performs synchronization and timing recovery algorithms at the appropriate symbol rate.

Data link layer (Layer 2) 408 looks the same for all protocols. In one embodiment, data link layer 408 is implemented for inbound channels in device driver 304 with Reed-Solomon decoding of the inbound data packets, checksum verification, and packet identification. Other decoding, verification and identification schemes may be used. In one embodiment, for multi-packet transmissions from a single paging device (e.g., subscriber device), device driver 304 extracts the data contained in the initial packet to determine the number of additional packets that follow for the message and must be received.

For the outbound channel, forward channel data link layer 401 performs the data formatting aspects of the protocol, such as block interleaving, synchronization pattern generation and detection, and formatting of all fields and parameters within those fields. In one embodiment, the outbound channel controls the message on a per frame basis. For example, each REFLEX cycle has 128 frames. With six outbound channels, there is a total of 768 frames. Each of these 768 frames is individually controlled. For example, the NOC may put an address in one frame and the message in another frame on the same channel or on other channels separated by a predetermined amount of time (e.g., four minutes). Forward channel data link layer 401 is able to implement such a scenario. In one embodiment, forward data link layer 401 performs such a scenario by using sets of pointers between the address and message.

In one embodiment, each message generated by the NOC is able to format itself at the data link layer 401. That is, when a message propagates through the forward channel layers and reaches forward channel data link layer 401, a messaging object specifies the protocol to which it is associated and generates addressing data formatted for that protocol. Data link layer 401 takes the codewords and places them in the correct position in the frame. The same occurs for vector and messaging fields.

Network layer (Layer 3) outbound channel layer 402 handles the routing of message traffic to the appropriate frame and outbound sub channel number. In one embodiment, each frame within every cycle of an outbound channel, contained within a 1 hour sequence, is modeled as a destination node. Thus, there are 128 destination nodes per cycle for each outbound channel, and 1920 destination nodes within a 1 hour period per channel.

When a paging device listens to a particular frame of the outbound channel, it has a temporary virtual connection to the NOC. In this layer, the NOC determines in which frames those virtual connections will occur for a particular paging device, and on which sub channel. This allows the NOC to route outbound messages to a paging device appropriately, using the current values of the NOC collapse parameters, and the paging device collapse parameters. In other words, forward channel network layer 402 determines in which frame to transmit a message. This determination may be based on the duty cycle and the class definition parameters associated with the paging device. The routing and transit information is imported into the messaging objects and when the object is communicated to the data link layer 401, the information is embedded in the object.

In one embodiment, the NOC uses a packing algorithm which reduces the transmission time required to transmit messages within each ReFLEX™ frame. This could reduce the average power consumption of a commercial transmitter by reducing the percentage of time it must be keyed at its rated output power (i.e., the amount of time the transmitter is on). In addition, optimal packing of each frame allows more messages to be placed in each frame. Thus, another benefit of this algorithm is that it maximizes the capacity of a channel, such as a ReFLEX™ or FLEX™ channel.

The packing algorithm operates in conjunction with the dynamic message scheduling of protocol engine 303. As new messages arrive in a given frame, the entire frame is re-packed using this algorithm. Messages typically include address, vector and message components. After each is transmitted, the transmitter may turn off. As opposed to the prior art where a static allocation of time within all frames is assigned for each of these components, the present invention assigns the time interval for each of the message components on a per frame basis. Immediately before the frame is transmitted, all message components are packed into the front end of the frame. In this manner, the transmitter may be turned off in the back end of the frame. In one embodiment, the integrity of transmitted data is ensured under all conditions.

In addition, scheduling constraint information for both the outbound and inbound channels is extracted from the paging device class definition database, and handled by forward channel network layer 402. These constraints may include the minimum outbound channel switching time and the minimum outbound to inbound channel switching time.

For the inbound channel, reverse channel network layer 403 is responsible for associating an inbound channel transmission with an outbound channel transmission. For example, an inbound acknowledgment packet is associated with the outbound channel message in this layer. Reverse channel network layer 403 is responsible for matching the forward channel and reverse channel messages based on the timeslots for transmission exchanged between transport layers 405 and 406. In one embodiment, each message object specifies in which frame transmission is to occur and reverse channel network layer 403 correlates the outbound message and the inbound acknowledge message. Reverse channel network layer 403 passes on this information to transport layer 405, which performs certain functions, such as database checking, discussed in more detail below.

Transport layer (Layer 4) outbound and inbound channel 404 and 405 handle outbound and inbound channel ARQ transmissions. When a paging device wants to originate a message, forward transport layer 404 handles obtaining the portions of the message and reassembling it into an entire message. Reverse channel transport layer 405 maintains a list of all outstanding messages that haven't been acknowledged and maintains a timer for each message. If a paging device doesn't respond within the timing window set forth by the timeout period of the timer, then reverse channel transport 405 indicates to forward channel transport layer 404 that the message is to be sent again (with the assumption that the paging device didn't receive the message). Reverse channel transport layer 405 also determines that the message was error free.

To facilitate this repeating of messages, transport layers 404 and 405 include message retry logic. When acknowledgment is received through the reverse channel and an error occurs, retry logic at the reverse channel transport layer 405 signals the forward channel transport layer 405 which is buffering the previously sent message to indicate to forward transport layer 404 that the message is to be resent. Class definition database information is used at this level to handle device constraints such as maximum paging device transmission time and maximum outbound channel message fragment size. The forward channel transport layer 404 and the reverse channel transport layer 405 exchange information in a class definition database. The database maintains information specific to the class of the device. This information may include certain limitations of the device being tested. The NOC system requires such information so that it knows how to retry a message and how to schedule transmissions to and from the paging device during a test.

Forward channel session layer (Layer 5) 406 functionality block handles the generation of outbound channel message sessions. In other words, channel session forward layer 406 handles new messaging sessions. Each session has its own session number which is used for all communications with the paging device. For example, as a new message is to be sent, the forward channel session layer 406 assigns a session number. All retries for this message use the session number. To facilitate this, the session number is incorporated into a portion of the object. In another embodiment, session layer 406 also determines what message types are allowed for a particular paging device, the current session number sliding windows for both outbound and inbound channels, and the current set of addresses programmed into the subscriber device. Device registration is validated in this layer by matching the address of the inbound registration request with a valid subscriber device in the subscriber device database.

Reverse channel session layer 407 is responsible for determining whether the message transmitted from a paging device on the reverse channel is a valid paging device. A database is searched based on the address of the paging device. If the paging device is registered, then the message is communicated to a forward channel and that page message is sent out.

If a repeat option is set, then a message is sent through the forward channel of the protocol engine and is buffered at the forward channel session layer 406. When acknowledgment is received back through device driver 304 through the reverse channel layers, reverse channel session layer 407 provides (signals) a repeat indication to the port channel session layer 406, causing the previously sent message to be resent through the forward channel layers and out through device driver 304.

2. Protocol Dependent Protocol Engine

Figure 5:
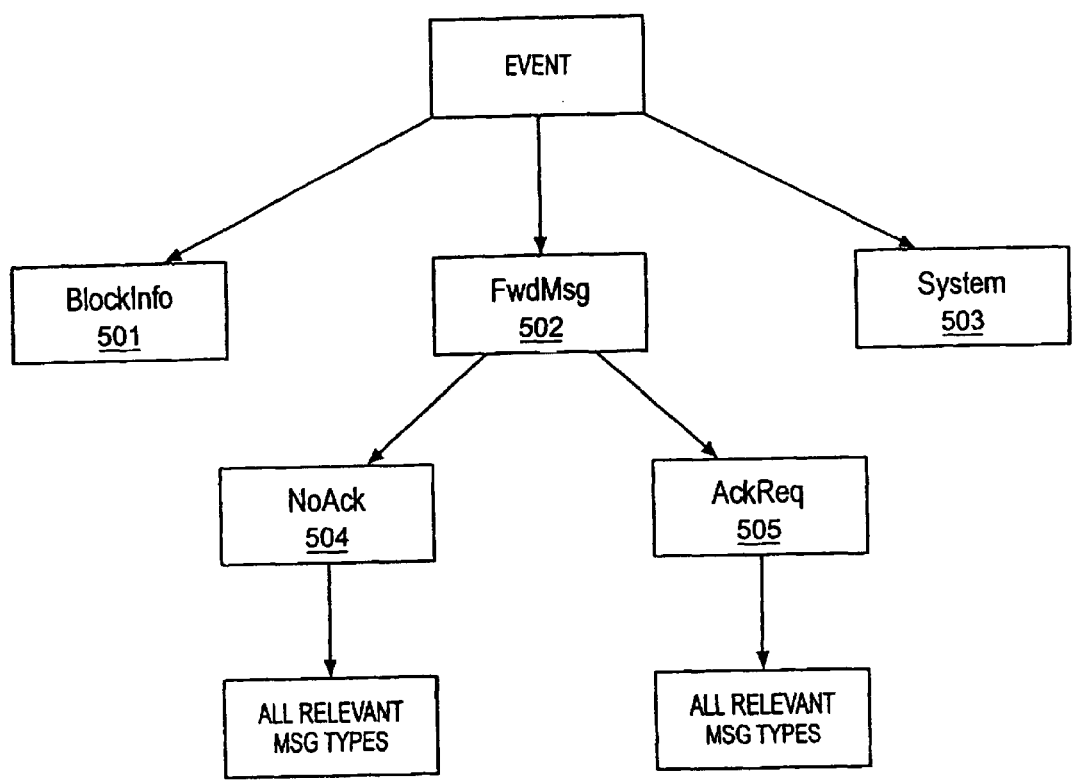
FIG. 5 illustrates one embodiment of an object decomposition of protocol-specific protocol engine objects.

FIG. 5 illustrates one embodiment of the events, or objects, supported in one embodiment of the NOC. The leaf nodes in FIG. 5 represent actual objects within the protocol engine, which include block information (BlockInfo) object 501, forward message (fwrdmsg) objects 502, and system objects 503. The objects have a common structure. The internal tree nodes represent classifications of these objects. BlockInfo block 501 encompasses block information field objects for each of the family protocols supported by the NOC. These BlockInfo objects are capable of generating the correct data structures for their respective protocols in this field. The objects are also capable of generating Automated Test Suite files and importing data from these files as well. In one embodiment, each of these objects may include configuration information and data specific for a protocol that is communicated to the paging to enable the paging device to how the system NOC is configured.

Forward messages 502 include messages that are not acknowledged 504 and those messages requiring acknowledgment 505.

In one embodiment, the relevant message types supported by this engine include alphanumeric, numeric, binary, over the air programming (OTAP), etc. Capability for embedded canned message tokens and multiple choice response options is also provided, in addition to the ability to generate and import Automated Test Suite files.

System 503 objects configure the operation of the NOC system, such as, for example, objects specifying the transmit power level, transmit frequency, or protocol types (e.g., FLEX, REFLEX). This information may be included in the class definition database, the subscriber device database, etc.

Objects may be read in from an ATS file or through user interface 302 and enter protocol engine 303 at forward channel session layer 406 and continue through the forward channel layers, with each layer extracting parameters to perform its functionality.

3. Device Driver

Device driver 304 is a full-duplex signal processing module. In one embodiment, device driver 304 is capable of transmitting FLEX™, ReFLEX25™, or ReFLEX50™ frames on up to 4 outbound channels simultaneously. These frames are not static bit patterns, but contain dynamic information that is generated by the NOC application in real-time. While doing this, device driver 304 is also capable of detecting incoming data packets on up to 2 inbound channels simultaneously. The baud rate of each inbound channel is also adjustable on a per-frame basis. Signal generators 103 for each outbound channel are also individually configured and controlled by device driver 304 over GPIB bus 104. Each frame, the output amplitude of each signal generator is adjusted, to simulate the portion of the frame in which they are "keyed on" and the portion when they are "keyed off".

Double-buffering is performed by device driver 304 on outbound frames from the NOC application program, which allows device driver 304 to transmit data while receiving data.

Figure 6:
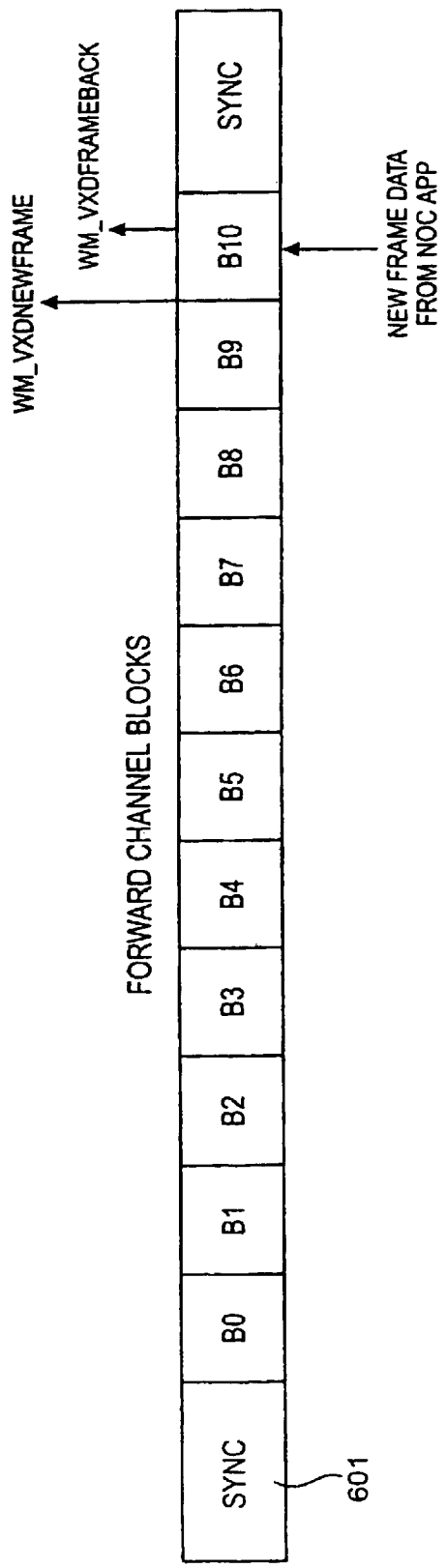
FIG. 6 illustrates outbound channel message passing.

As is shown in FIG. 6, the REFLEX frame is shown with a synch pattern 601 and eleven blocks of data. The frame indicates when communication occurs between device driver 304 and protocol engine 303. Device driver 304 requests a new frame of data from the NOC application (WM_VXDNEWFRAME) prior to the conclusion of the current frame, and the NOC application responds to this request prior to the start of the next frame. In one embodiment, the request occurs after 9 of the 11 blocks in the frame. In response, the NOC application responds with a new frame. An acknowledgment from the device driver 304 (WM_VXDFRAMEACK) is provided as confirmation that the data transfer was successful. This allows device driver 304 to continuously transmit frame data, without any required guard time for receiving the next frame of data. Similarly, for new messages from a paging device, device driver 304 signals the NOC application indicating that it has a registration request. The NOC, in response to this signaling, reads the data out of device driver 304.

Device driver 304 itself has no knowledge of the structure of the protocol e.g., (ReFLEX™) itself. Device driver 304 takes the data stream that comprises one block of data and modulates the symbols onto the forward channel.

In one embodiment, the only requirement for device driver 304 is, for each frame, to transmit a buffer of 6000 symbols at 3200 baud on each outbound channel, with 2-bits per symbol. This is consistent with the 6400 bps signaling rate. For slower rates, the NOC application is responsible for formatting the data within the 6000 symbols to produce the slower modulation. The FSK deviations for the symbols are either the ReFLEX™ deviations: ±800, ±2400 Hz, or the FLEX™ deviations: ±1600, ±4800 Hz. This can be selected on a per-frame basis for each channel. As a result, device driver 304 enables the NOC application to switch between protocols, and/or between outbound channel speeds on a per-frame basis on each of the 4 outbound channels.

Inbound channel synchronization and symbol detection is performed at one of 4 possible inbound channel speeds. In one embodiment, the available speeds are 800 baud, 1600 baud, 3200 baud, and 9600 baud. Again, the selection of the inbound channel speed is possible on a per-frame basis for each inbound channel. In one embodiment, the inbound channel is sampled by a 12-bit A/D converter at 28.8 Ksamp/s. Since inbound channel modulation is 4-level FSK, there are 2 bits per symbol. The number of samples per symbol for each rate is: 72 samples at 800 baud; 36 samples at 1600 baud, 18 samples at 3200 baud, and 6 samples at 9600 baud. This rate ensures that even at the highest baud rate, there are sufficient samples per symbol to achieve reasonable receiver sensitivity.

In one embodiment, device driver 304 has an interrupt service routine, which processes a 3200 Hz clock interrupt that is generated by the clock card. At this rate, there are 9 new samples in the A/D FIFO in A/D board 202 on each hardware interrupt. These 9 samples are appended to the end of a circular buffer. The packet synchronization algorithm scans this circular buffer looking for a sync field match on each hardware interrupt.

On receiving messages, as packets are being received, device driver 304 looks at the first slot to identify the packet type. This directly effects the scheduling of messages (e.g., acknowledgments). For every forward channel, there are a number of slots on the reverse channel that are time synchronized. In those slots, acknowledgment messages, originated from paging devices, and registration messages are transmitted. However such transmissions must occur on or more designated slots. For example, an acknowledgment packet that is received by the NOC is only one slot long. However when a message is sent it may be several slots long. Therefore, the NOC must quickly determine after the first packet slot is received whether there are additional packets to follow.

In one embodiment, a checksum is calculated on the message to enable detection. If not performed fast enough, the NOC must be capable of capturing all of the data regardless of its size. A problem associated with the such a system is that if the NOC must assume that each reverse channel transmission is a certain number of slots, then certain slots cannot be scheduled by the NOC. Therefore, in those cases where the packet type is a one slot acknowledgment, the additional slots that were presumed to have message information are discarded, and thus they cannot be scheduled for other packets.

When a sync match is detected, the data bits for the rest of the packet are detected and stored in an array. A Reed-Solomon decoder algorithm performs error-correction on the incoming bits. A checksum algorithm follows Reed-Solomon, and a determination of whether to discard the packet is made at the end of each algorithm processing step. In one embodiment, the checksum is calculated on the fly. By performing these functions, a quick determination may be made regarding the size of the message.

If the incoming packet data passes both steps, then the packet type is determined. This is the only portion of device driver 304 that has knowledge of the protocol (ReFLEX™) data structure. From the packet type, device driver 304 determines if a multi-packet transmission has occurred. If not, then the information bits from the single-packet of data are transferred to the NOC application. If so, then the additional packets of data are captured by device driver 304, and the Reed-Solomon decoding algorithm is executed for each packet. The resulting string of information bits for all the packets is then transferred to the NOC application.

Figure 7:
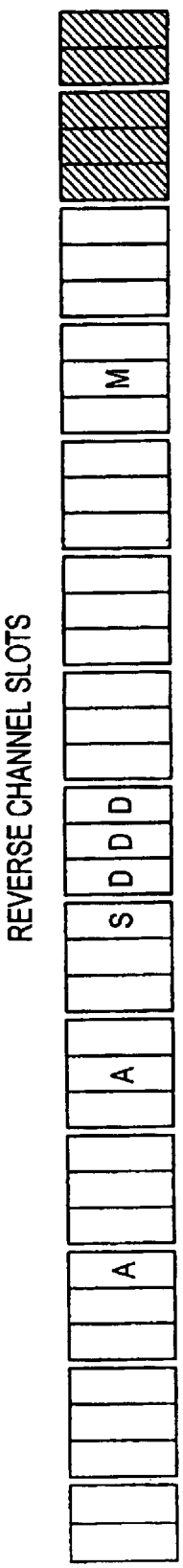
FIG. 7 illustrates inbound channel packet transmission.

For example, in FIG. 7, there are several slots within a frame that can contain a paging device transmission. Device driver 304 scans each of these slots, looking for an incoming packet. If a packet of type 'S' is detected, it then processes the remaining 'D', or data, packets. These packets do not contain synchronization pattern, and are handled differently. A packet of type "A" is an acknowledge packet. A packet of type "M" is a message packet.

C. Automated Test Suites

The Automated Test Suite (ATS) capability allows users access to control parameters within the system, such as, for example, output channel power level, and protocol type and channel speed. One attribute of the ATS capability is that one or more parameters within any field in an (FLEX™, ReFLEX™, etc.) outbound channel can (e.g., (FLEX™, ReFLEX™, etc.) be individually controlled. In one embodiment, these parameters are controllable on a per frame basis within a 1 hour sliding window.

Another feature is that configuration data for multiple protocols can co-exist in a single ATS file. This allows the NOC to be configured to interleave multiple protocols on multiple channel streams.

In one embodiment, ATS files can be loaded into the NOC dynamically. Thus, while the NOC is transmitting outbound channel data, and receiving inbound channel data, the console operator can completely re-configure the NOC by simply loading a new ATS file.

Outbound message types, such as alphanumeric, numeric, binary, etc., are supported for all protocols. This allows users the ability to replay specific messaging scenarios in an automated, scripting fashion. Class definition and subscriber databases are also included in the ATS. These databases are specific to each protocol and provide specific information that the NOC needs to know in order to properly communicate with each subscriber device.

In one embodiment, the mechanism for enabling ATS file capability is an ASCII text file, containing ATS file records. ATS files can be generated and loaded by the NOC. When an ATS file is generated, the current state of protocol engine 303 is saved in the newly created ATS file. Descriptive comments may be appended to each line in the file to increase its legibility.

The ATS file structure is based on a tagged file record format. A record exists for each paging device that the NOC system will test. Each record entry in the file begins with a record type parameter, followed by a record length parameter. The information in the record may include information about which addresses are programmed into the device, the number of simultaneous messages that may be received at the same time, the signature that should be on the first message, the duty cycle (collapse values) of the paging device and/or any other information that the NOC uses to effectively test the paging device. The information in the record may also include information which determines which of the forward channel frequencies the pager will listen to. This allows unknown record types to be discarded by the NOC without corrupting the records which follow. Users can modify ATS files, or create their own, although it is preferred that a NOC-generated ATS file be used as a template. Below is an example ATS file that was created by the NOC application. Note that other types of records are possible in an ATS file. In one embodiment, there are record types for each outbound message type, protocol type and protocol speed.

```
Contents of an Example ATS File
/* This is the test113.ats file
*/
/*----------------------------------------------------------*/
/* ReFLEX50 Class Definition Database */
1          /* Record type*/
139        /* Number of lines remaining in this record */
6          /* Number of PMUs registered in the R50 Database */
0x4400450  /* Primary Personal Addr */
0x0        /* Additional Personal Addr 1 */
0x0        /* Additional Personal Addr 2 */
0x0        /* Additional Personal Addr 3 */
0x660      /* Information Service Addr 0 */
0x0        /* Information Service Addr 1 */
0x0        /* Information Service Addr 2 */
0x0        /* Information Service Addr 3 */
0          /* Max Collapse for Primary Personal Address */
0          /* Max Collapse for Personal Address 1 */
0          /* Max Collapse for Personal Address 2 */
0          /* Max Collapse for Personal Address 3 */
0          /* Max Collapse for Info Svc Address 0 */
0          /* Max Collapse for Info Svc Address 1 */
0          /* Max Collapse for Info Svc Address 2 */
0          /* Max Collapse for Info Svc Address 3 */
9          /* Home control channel logical number */
3          /* Personal Collapse Mask value */
80         /* Personal Collapse Mask Start Frame */
17         /* Starting signature value for messages sent to this unit */
7          /* Information Service Collapse Mask value */
0          /* Information Service Collapse Mask Start Frame */
1          /* Semaphore count of # of simultaneous sessions to this PMU */
0x4400473  /* Primary Personal Addr */
0x0        /* Additional Personal Addr 1 */
0x0        /* Additional Personal Addr 2 */
0x0        /* Additional Personal Addr 3 */
0x30660    /* Information Service Addr 0 */
0x0        /* Information Service Addr 1 */
0x0        /* Information Service Addr 2 */
0x0        /* Information Service Addr 3 */
0          /* Max Collapse for Primary Personal Address */
0          /* Max Collapse for Personal Address 1 */
0          /* Max Collapse for Personal Address 2 */
0          /* Max Collapse for Personal Address 3 */
0          /* Max Collapse for Info Svc Address 0 */
0          /* Max Collapse for Info Svc Address 1 */
0          /* Max Collapse for Info Svc Address 2 */
0          /* Max Collapse for Info Svc Address 3 */
11         /* Home control channel logical number */
3          /* Personal Collapse Mask value */
115        /* Personal Collapse Mask Start Frame */
16         /* Starting signature value for messages sent to this unit */
7          /* Information Service Collapse Mask value */
0          /* Information Service Collapse Mask Start Frame */
0          /* Semaphore count of # of simultaneous sessions to this PMU */
0x44005a6  /* Primary Personal Addr */
0x0        /* Additional Personal Addr 1 */
0x0        /* Additional Personal Addr 2 */
0x0        /* Additional Personal Addr 3 */
0x660      /* Information Service Addr 0 */
0x0        /* Information Service Addr 1 */
0x0        /* Information Service Addr 2 */
0x0        /* Information Service Addr 3 */
0          /* Max Collapse for Primary Personal Address */
0          /* Max Collapse for Personal Address 1 */
0          /* Max Collapse for Personal Address 2 */
0          /* Max Collapse for Personal Address 3 */
0          /* Max Collapse for Info Svc Address 0 */
0          /* Max Collapse for Info Svc Address 1 */
0          /* Max Collapse for Info Svc Address 2 */
0          /* Max Collapse for Info Svc Address 3 */
11         /* Home control channel logical number */
3          /* Personal Collapse Mask value */
38         /* Personal Collapse Mask Start Frame */
16         /* Starting signature value for messages sent to this unit */
7          /* Information Service Collapse Mask value */
0          /* Information Service Collapse Mask Start Frame */
0          /* Semaphore count of # of simultaneous sessions to this PMU */
0xcc02d7d  /* Primary Personal Addr */
0x0        /* Additional Personal Addr 1 */
```

-continued

```
0x0      /* Additional Personal Addr 2 */
0x0      /* Additional Personal Addr 3 */
0x10660     /* Information Service Addr 0 */
0x0      /* Information Service Addr 1 */
0x0      /* Information Service Addr 2 */
0x0      /* Information Service Addr 3 */
0        /* Max Collapse for Primary Personal Address */
0        /* Max Collapse for Personal Address 1 */
0        /* Max Collapse for Personal Address 2 */
0        /* Max Collapse for Personal Address 3 */
0        /* Max Collapse for Info Svc Address 0 */
0        /* Max Collapse for Info Svc Address 1 */
0        /* Max Collapse for Info Svc Address 2 */
0        /* Max Collapse for Info Svc Address 3 */
11       /* Home control channel logical number */
3        /* Personal Collapse Mask value */
125      /* Personal Collapse Mask Start Frame */
16       /* Starting signature value for messages sent to this unit */
7        /* Information Service Collapse Mask value */
0        /* Information Service Collapse Mask Start Frame */
0        /* Semaphore count of # of simultaneous sessions to this PMU */
0xcc02e6a    /* Primary Personal Addr */
0x0      /* Additional Personal Addr 1 */
0x0      /* Additional Personal Addr 2 */
0x0      /* Additional Personal Addr 3 */
0x20660     /* Information Service Addr 0 */
0x0      /* Information Service Addr 1 */
0x0      /* Information Service Addr 2 */
0x0      /* Information Service Addr 3 */
0        /* Max Collapse for Primary Personal Address */
0        /* Max Collapse for Personal Address 1 */
0        /* Max Collapse for Personal Address 2 */
0        /* Max Collapse for Personal Address 3 */
0        /* Max Collapse for Info Svc Address 0 */
0        /* Max Collapse for Info Svc Address 1 */
0        /* Max Collapse for Info Svc Address 2 */
0        /* Max Collapse for Info Svc Address 3 */
11       /* Home control channel logical number */
3        /* Personal Collapse Mask value */
106      /* Personal Collapse Mask Start Frame */
16       /* Starting signature value for messages sent to this unit */
7        /* Information Service Collapse Mask value */
0        /* Information Service Collapse Mask Start Frame */
0        /* Semaphore count of # of simultaneous sessions to this PMU */
0x440044a    /* Primary Personal Addr */
0x0      /* Additional Personal Addr 1 */
0x0      /* Additional Personal Addr 2 */
0x0      /* Additional Personal Addr 3 */
0x30660     /* Information Service Addr 0 */
0x0      /* Information Service Addr 1 */
0x0      /* Information Service Addr 2 */
0x0      /* Information Service Addr 3 */
0        /* Max Collapse for Primary Personal Address */
0        /* Max Collapse for Personal Address 1 */
0        /* Max Collapse for Personal Address 2 */
0        /* Max Collapse for Personal Address 3 */
0        /* Max Collapse for Info Svc Address 0 */
0        /* Max Collapse for Info Svc Address 1 */
0        /* Max Collapse for Info Svc Address 2 */
0        /* Max Collapse for Info Svc Address 3 */
11       /* Home control channel logical number */
3        /* Personal Collapse Mask value */
74       /* Personal Collapse Mask Start Frame */
16       /* Starting signature value for messages sent to this unit */
7        /* Information Service Collapse Mask value */
0        /* Information Service Collapse Mask Start Frame */
0        /* Semaphore count of # of simultaneous sessions to this PMU */
/*-----------------------------------------------------*/
/* FLEX/ReFLEX Frame Synchronization Record */
2        /* Record type */
11       /* Number of lines remaining in this record */
-1       /* Cycle Number */
0        /* Starting frame */
0        /* Repeat count for this record */
0        /* Forward channel number of the record */
6        /* ReFLEX protocol A pattern */
0        /* A pattern errors */
0        /* Abar pattern errors */
0        /* ReFLEX protocol B pattern */
0        /* B pattern errors */
0        /* Frame Information Word Error pattern */
0        /* C pattern errors */
0        /* Cbar pattern errors */
/*-----------------------------------------------------*/
/* ReFLEX50 Block Information Field Record */
3        /* Record type */
52       /* Number of lines remaining in this record */
-1       /* Cycle Number */
-2       /* Starting frame */
0        /* Repeat count for this record */
-1       /* Control channel of BI words */
1        /* Number of Forward Sub-channels */
1        /* Number of Control Sub-channels */
0        /* Personal Address Carry On */
0        /* Personal Address Collapse Mask */
0        /* Information Service Address Carry On */
0        /* Information Service Collapse Mask */
0        /* Global registration bit */
0x400f      /* BI word formats selected by this record */
0        /* Format Type */
45       /* Aloha/Scheduled slot boundary */
0        /* Reverse channel speed */
1        /* Aloha enabled */
1        /* Format Type */
45       /* Aloha/Scheduled slot boundary */
0        /* Reverse channel speed */
0        /* Aloha enabled */
2        /* Format Type */
45       /* Aloha/Scheduled slot boundary */
0        /* Reverse channel speed */
1        /* Aloha enabled */
3        /* Format Type */
45       /* Aloha/Scheduled slot boundary */
0        /* Reverse channel speed */
1        /* Aloha enabled */
4        /* Format Type */
45       /* Aloha/Scheduled slot boundary */
1        /* Reverse channel speed */
1        /* Aloha enabled */
5        /* Format Type */
45       /* Aloha/Scheduled slot boundary */
0        /* Reverse channel speed */
1        /* Aloha enabled */
6        /* Format Type */
45       /* Aloha/Scheduled slot boundary */
0        /* Reverse channel speed */
1        /* Aloha enabled */
7        /* Format Type */
45       /* Aloha/Scheduled slot boundary */
0        /* Reverse channel speed */
7        /* Reverse channel start */
1        /* Aloha timeout period */
1        /* Aloha enabled */
8        /* Format Type */
1        /* Aloha timeout period */
14       /* Format Type */
0        /* Zone ID */
15       /* Format Type */
1        /* Local Channel ID */
/*-----------------------------------------------------*/
/* ReFLEX50 Single-Channel Alphanumeric Record */
4        /* Record type */
25       /* Number of lines remaining in this record */
0        /* Cycle Number */
2        /* Starting frame */
5999        /* Repeat count for this record */
0        /* Message Retry Count */
0        /* Address type */
0x4400450    /* PMU Address */
0x0      /* Bit field allowing the protocol engine to change the record contents */
0        /* Subchannel of message */
0        /* Message offset from address */
17       /* Length of msg */
A Default message
0        /* Message fragment number */
0        /* Message continuation */
0        /* Message encryption */
```

```
0       /* Message compression */
0       /* Type of ack response */
0       /* Reverse channel num (for ACK) */
0       /* Number of frames before ack is transmitted */
10      /* Slot number of ack packet */
0       /* Position pointer in ack flag field */
0       /* Mail drop flag */
0       /* Multiple choice response flag */
0       /* Canned message flag */
/*-----------------------------------------------------------*/
```

D. Serial Port Interface

The serial port interface provides a mechanism for transmitting messages to paging devices using an external computer system. Data is transported using variable-length record types. Data transfers from the serial port are asynchronous in nature, which allows for variable message scheduling delays in the NOC system. Each record type that is transmitted is acknowledged to ensure that the transfer was successful. In one embodiment, the message size for all outbound and inbound messages is limited to 32 Kbytes.

E. User Interface

FIGS. 8A to 8G illustrate an example user interface. There are two goals of the user interface for the test station. The first is to provide a clear, organized, and consistent view of the large amount of complex data. The second goal is to make NOC testing simple and easy to learn.

Figure 8A:
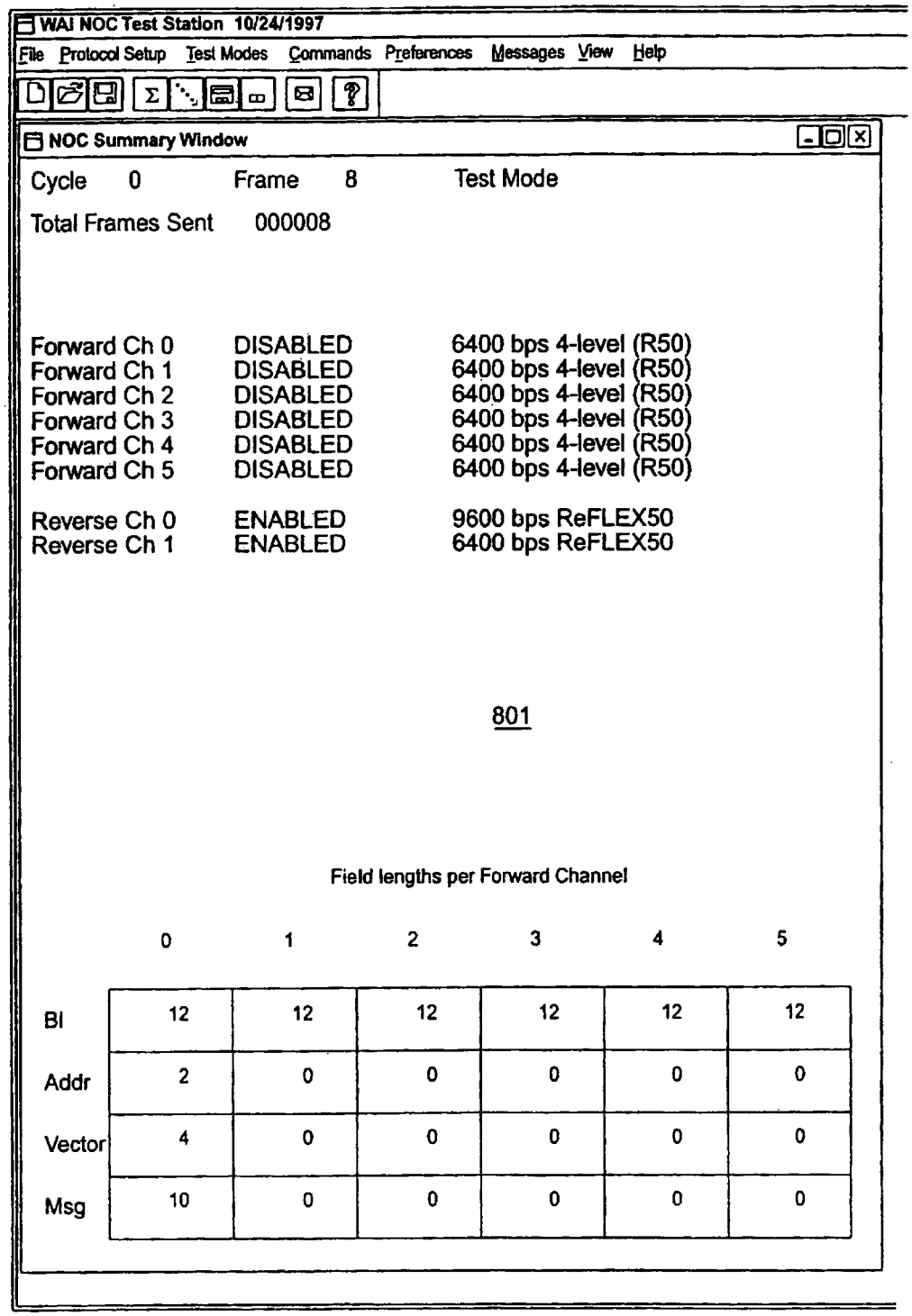
FIGS. 8A–8G illustrate a user interface.
Figures 1, 8A:
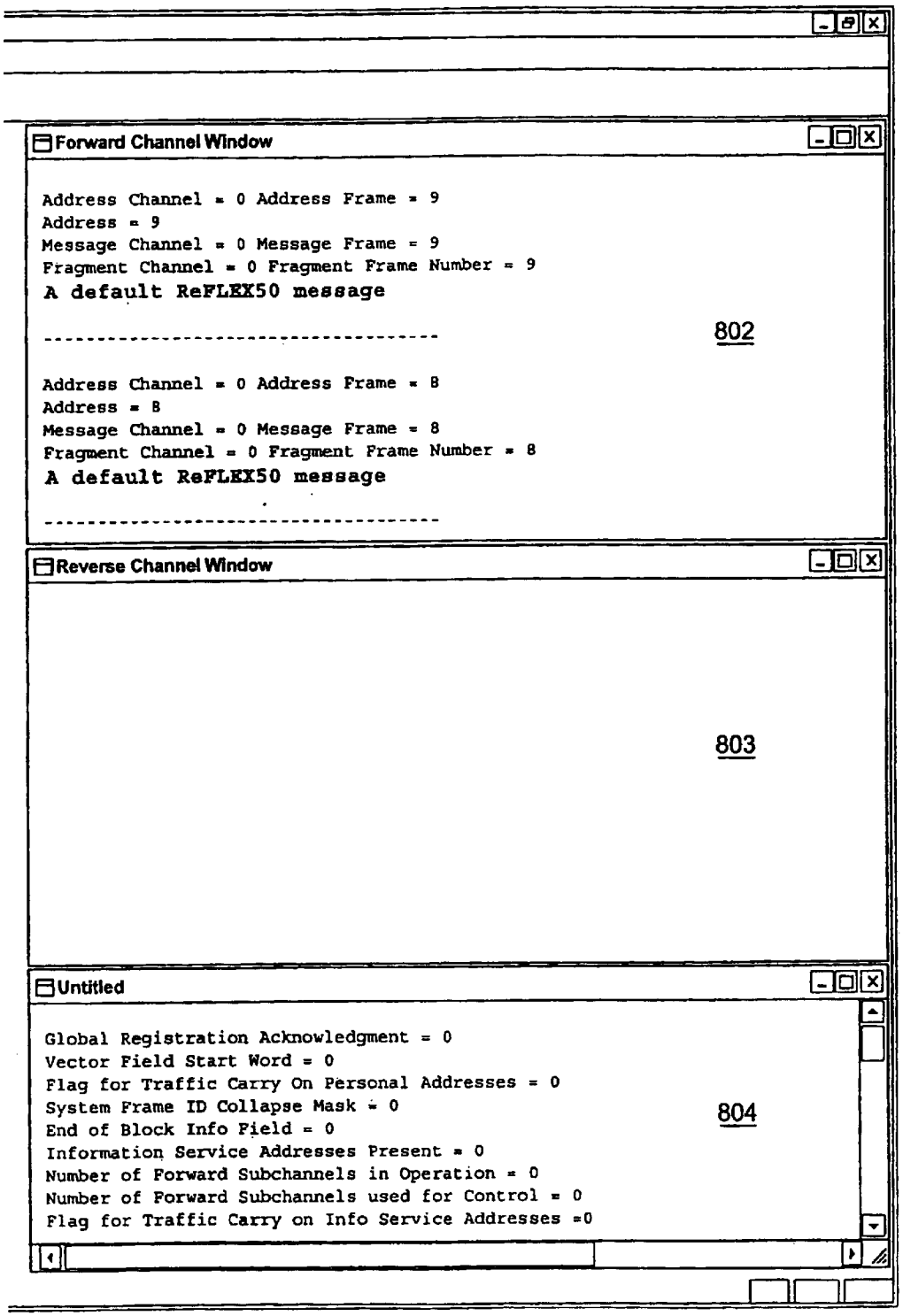

Referring to FIGS. 8A and 8A-1, data is organized visually into four groups:

Summary Window 801. Summary window 801 displays what protocol, speed, and test mode the user is testing. It also displays which channel is being used. This window gives the user information about which cycle and which frame the NOC is sending. This information may be used to read when the text is displayed in a large, boldface font. In one embodiment, when a channel is being used, the word "ENABLED" is displayed in green text and when a channel it is not, the word "DISABLED" is displayed in read text. The cycle number, frame number, total frames sent, and test mode are displayed. In one embodiment, these are displayed in reverse video because many NOC users may stand close to the display (e.g., PC monitor). NOC summary window 801 also displays the field lengths for forward channels 0–5, indicating the address, vector and message field lengths for each block.

Forward Channel Window 802. Forward channel window 802 displays data to indicate what is occurring on the forward channel. In one embodiment, window 802 is a smaller window than summary window 801 and has a horizontal scroll bar. This allows the user to scroll backwards a predetermined number of frames (e.g., three frames, or any number of frames) to look at data. In one embodiment, window 802 has two modes: a default one with a minimum set of data fields and an advanced mode with every data field.

Reverse Channel Window 803. Reverse channel window 803 displays data in the same manner as forward channel window 802.

Block Information Window 804. Block Information Window 804 displays data in the same manner as forward channel data window 802.

Figure 8B:
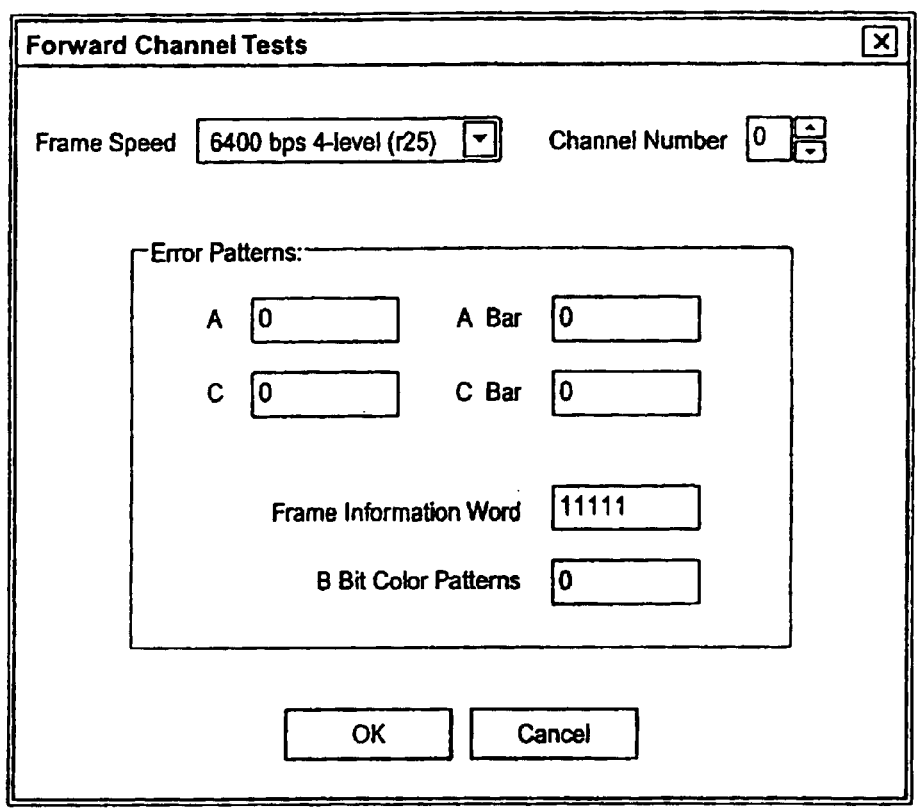

FIG. 8B illustrates a window for selecting a test on one of the forward channels. Referring to FIG. 8B, a list box with pre-selected frame speeds is used to select the frame speed. The pre-selected frame speed choices include an indication of the protocol for which the frame speed is possible. The forward channel is also selectable through up-down arrows which increase and decrease the channel number shown in the window. The forward channel test selection block also includes windows for specifying error patterns. In one embodiment, these windows allow for the user to enter a hexadecimal error pattern that is XORed with the requisite protocol parameter, thereby forcing errors on the transmitted data.

Figure 8C:
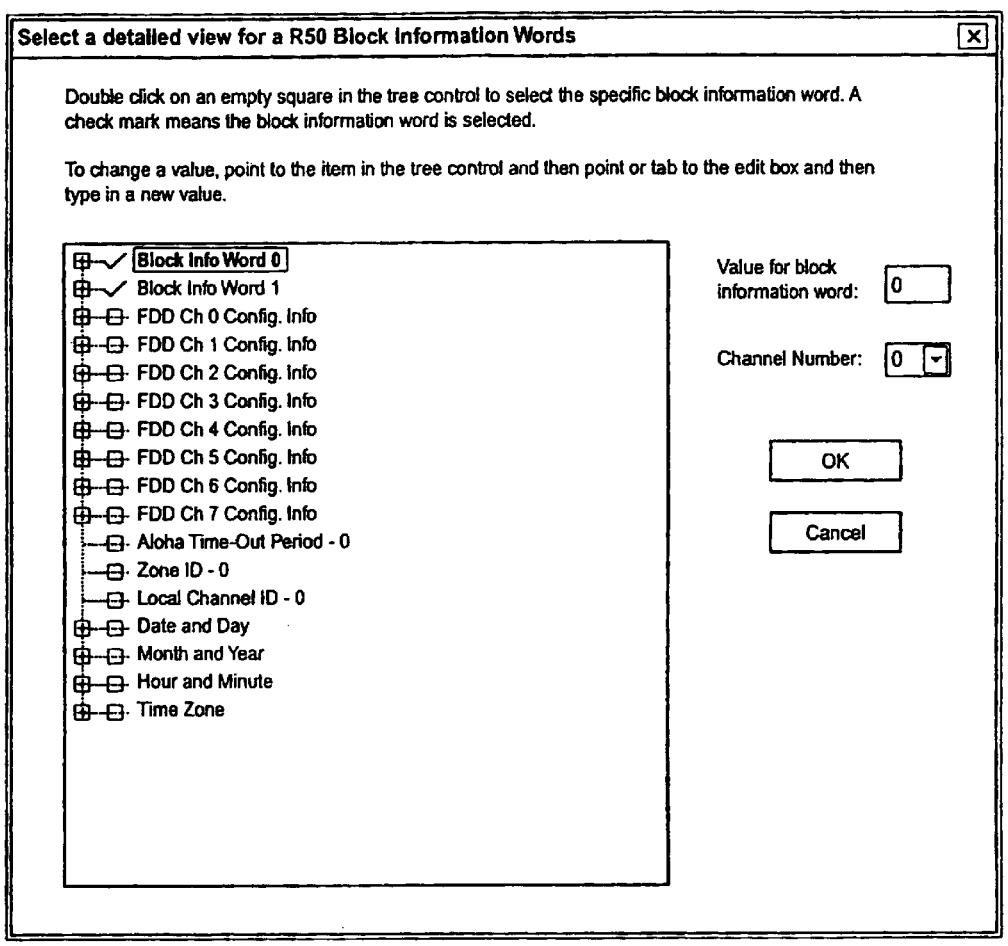

FIG. 8C illustrates an example window that may be used to specify what information is to appear in the block information window 804. As shown, multiple pre-selected choices appear in the window to specify different information that may be selected to appear at the same time in block information window 804. The user is also able to select the value for the block information word along with the channel number. The value for block information words allows a user to assign a value to the protocol parameter selected on the left view of the window.

Figure 8D:
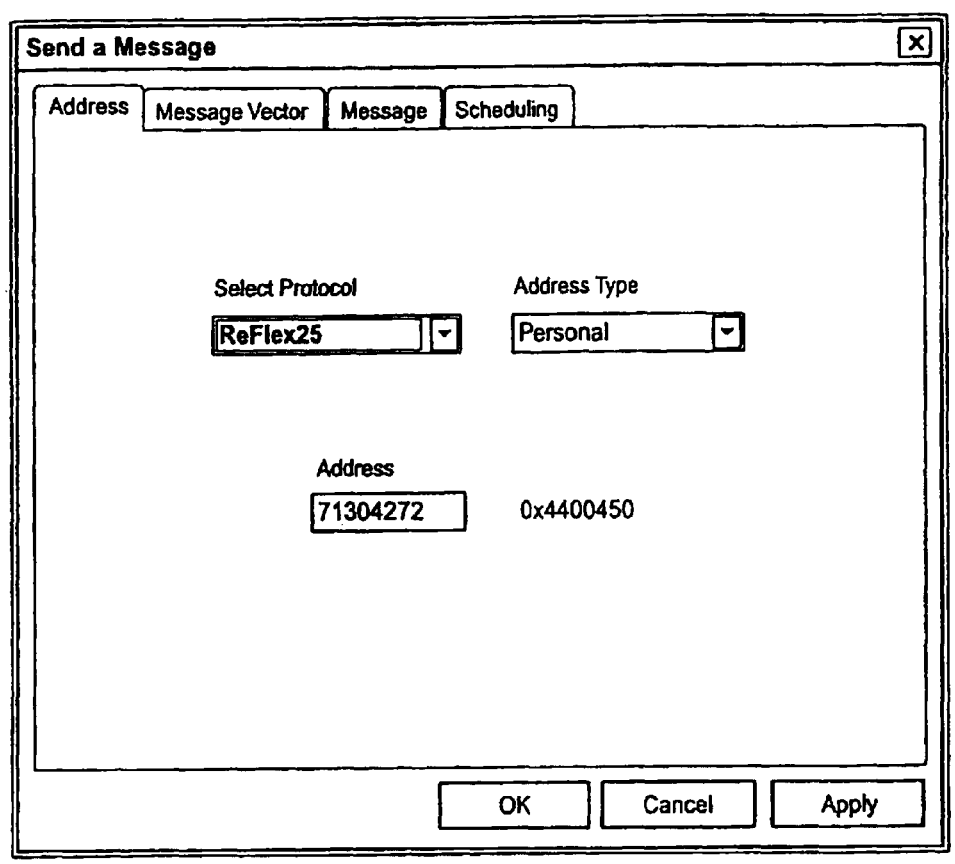

FIGS. 8D through 8G illustrate a series of windows that are used to send a message. Referring to FIG. 8D, an address dialog box includes a list box for selecting a protocol, the address type, and a box for entering the address. There are personal and information service address types.

Figure 8E:
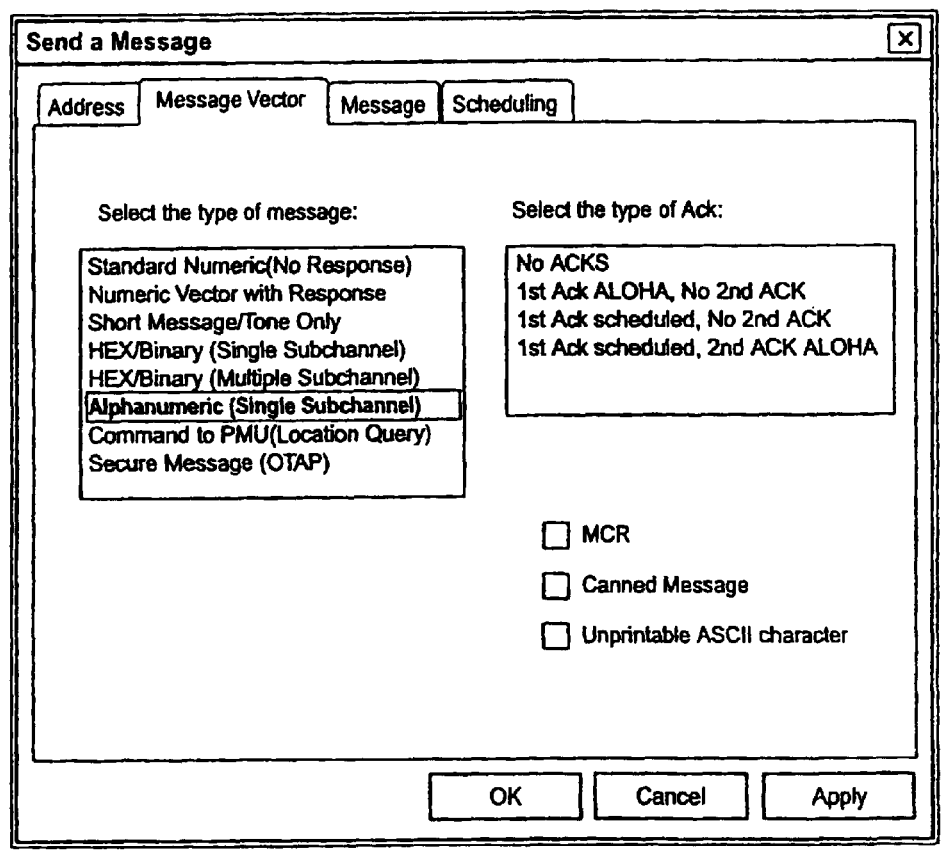

FIG. 8E illustrates a dialog box for specifying a message vector. The message vector dialog box includes a list box with pre-selected choices for selecting the type of message and another list box for selecting the type of acknowledgment, including a no acknowledgment selection. The user may select a multiple device responses or canned messages, which generate unprintable ASCII characters, as part of the message body.

Figure 8F:
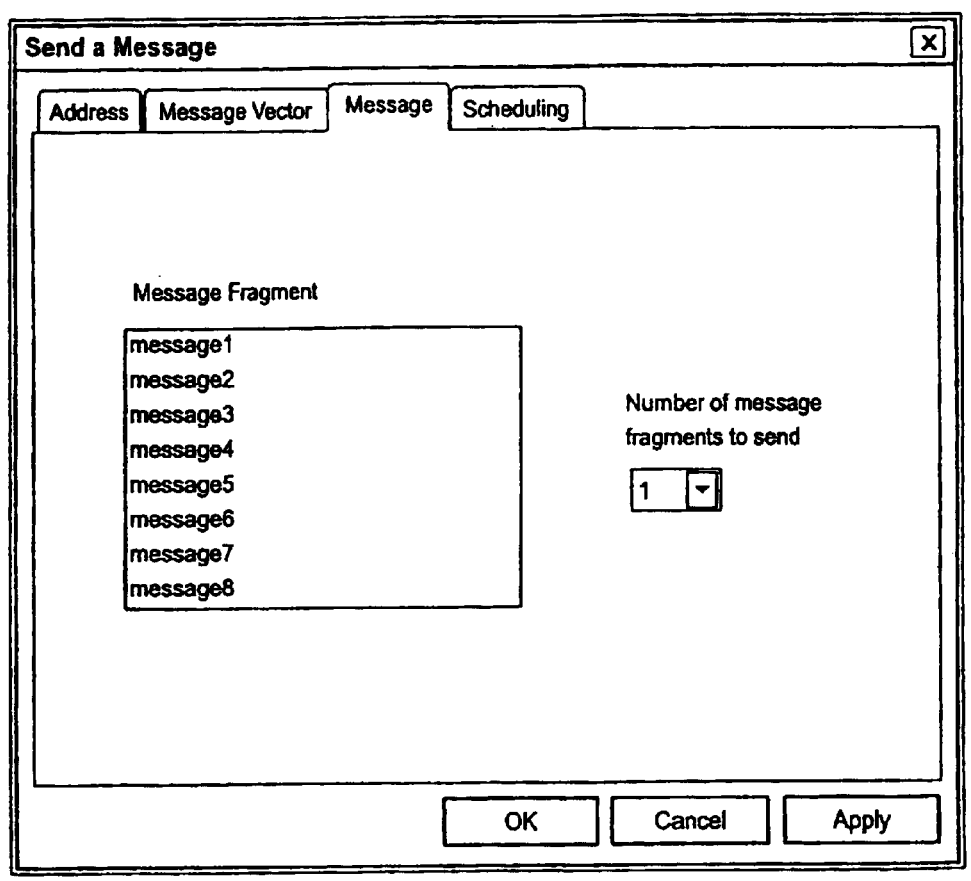

FIG. 8F illustrates a dialog box for specifying the message that is to be sent. The dialog box lists pre-selected choices for a number of message fragments and a scroll box that allows the user to select a number of message fragments to be sent.

Figure 8G:
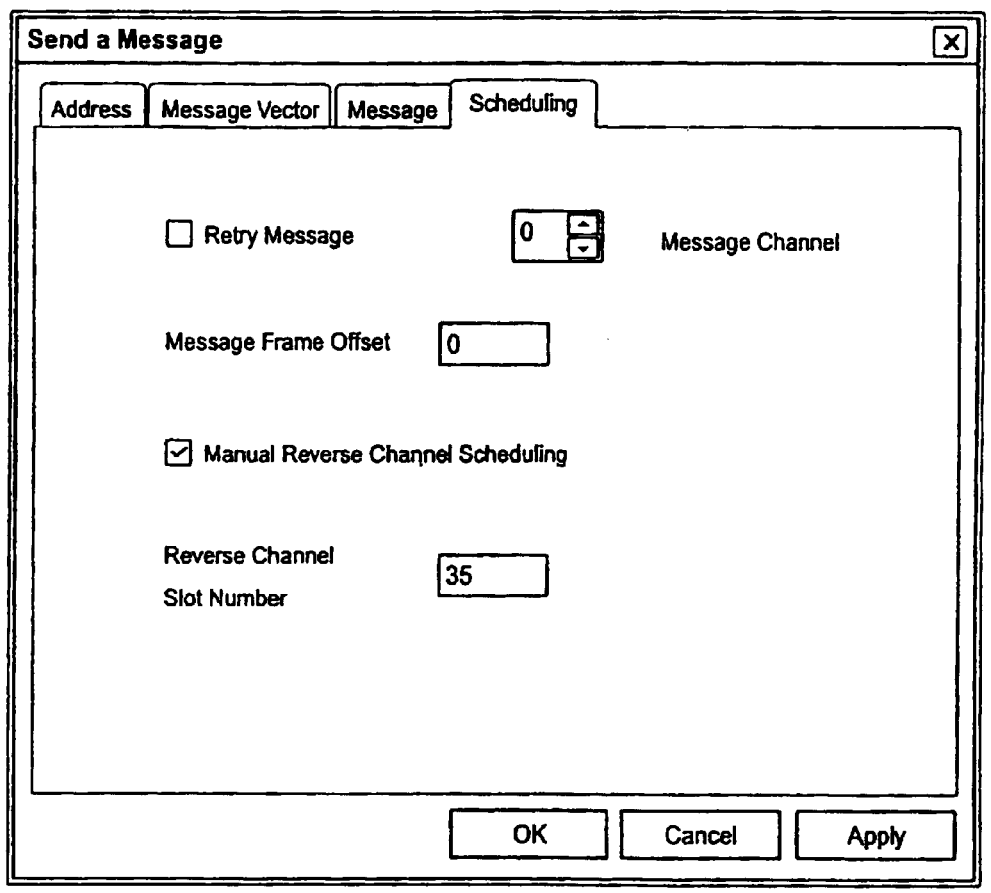

FIG. 8G illustrates a dialog box for selecting the scheduling of the message to be sent. The scheduling dialog box indicates whether the message will be retried after the first transmission, if there is an error in sending the message or in the case where no acknowledgment is received for a message. The scheduling dialog box also includes a scroll box for selecting the message channel and indicates a message tree offset. Furthermore, the scheduling dialog box allows for selection of manual reverse channel scheduling and the entry of the specific reverse channel slot number.

The user interface is simple and easy to learn because of the use of common conventions such as the dialog boxes to open, create, and save ATS files. Dialog boxes that contain as many scrollboxes and listboxes with pre-selected choices. This eliminates some redundant typing. When the user makes a selection in a dialog box, this selection is saved by the dialog box so that the last selection is displayed when the user brings up the dialog again.

In one embodiment, a NOC may be coupled to the backbone, such as an Internet backbone, by which a Java or other application may be used to capture data and stream it into a paging device. Further, the NOC may be used individually to provide a campus paging environment or with of NOCs coupled together to provide a local paging environment.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A system comprising:

at least one processor;

a protocol card coupled to said at least one processor;

a multiple channel digital-to-analog converter;

a plurality of signal generators coupled to the protocol card and the multiple channel digital-to-analog converter to transmit analog information received from the multiple channel digital-to-analog converter in response to control from the protocol card;

a plurality of radio frequency receivers; and a multiple channel analog-to-digital converter, coupled to the plurality of radio frequency receivers and said at least one processor, to convert analog information received by the plurality of radio frequency receivers to digital information for processing by said at least one processor.

* * * * *